(12) United States Patent
Horimoto

(10) Patent No.: US 6,815,938 B2
(45) Date of Patent: Nov. 9, 2004

(54) POWER SUPPLY UNIT HAVING A SOFT START FUNCTIONALITY AND PORTABLE APPARATUS EQUIPPED WITH SUCH POWER SUPPLY UNIT

(75) Inventor: Masashi Horimoto, Kyoto (JP)

(73) Assignee: Rohm Co., Ltd., Kyoto (JP)

( * ) Notice: Subject to any disclaimer, the term of this patent is extended or adjusted under 35 U.S.C. 154(b) by 15 days.

(21) Appl. No.: 10/397,480

(22) Filed: Mar. 26, 2003

(65) Prior Publication Data

US 2003/0185028 A1 Oct. 2, 2003

(30) Foreign Application Priority Data

Apr. 2, 2002 (JP) ........................................ 2002-099479

(51) Int. Cl.[7] ................................................ G05F 1/40
(52) U.S. Cl. ...................................... 323/282; 323/351
(58) Field of Search ................................ 323/225, 282, 323/283, 284, 288, 351, 901

(56) References Cited

U.S. PATENT DOCUMENTS

| | | | | |
|---|---|---|---|---|
| 5,909,362 A | * | 6/1999 | Adams | .................... 363/21.03 |
| 6,369,561 B1 | * | 4/2002 | Pappalardo et al. | ........ 323/285 |
| 6,522,115 B1 | * | 2/2003 | Greitschus | .................. 323/288 |
| 6,556,067 B2 | * | 4/2003 | Henry | ......................... 327/536 |
| 6,570,368 B2 | * | 5/2003 | Demizu | ...................... 323/282 |
| 2003/0214272 A1 | * | 11/2003 | Nishimaki | .................. 323/225 |
| 2004/0004470 A1 | * | 1/2004 | Yoshida et al. | ............. 323/284 |

* cited by examiner

*Primary Examiner*—Adolf Berhane
(74) *Attorney, Agent, or Firm*—Hogan & Hartson, LLP

(57) ABSTRACT

A DC-DC conversion type power supply unit has an error amplifier for feeding back the output voltage of the unit to one input terminal of the error amplifier during a startup of the unit. The input terminal is once fixed to a prohibition voltage that prohibits the output of the unit from being outputted therefrom for a predetermined period of time to charge up a feedback condenser. After the period, the feedback condenser discharges its electric charge to gradually raise the voltage of the input terminal to the reference voltage of the power supply unit, thereby allowing a soft start of the power supply unit without changing the reference source voltage of the unit.

23 Claims, 4 Drawing Sheets

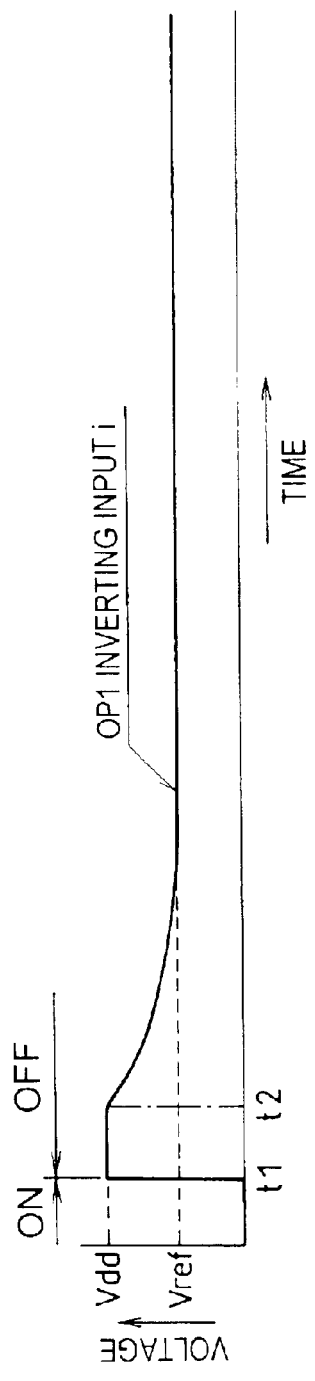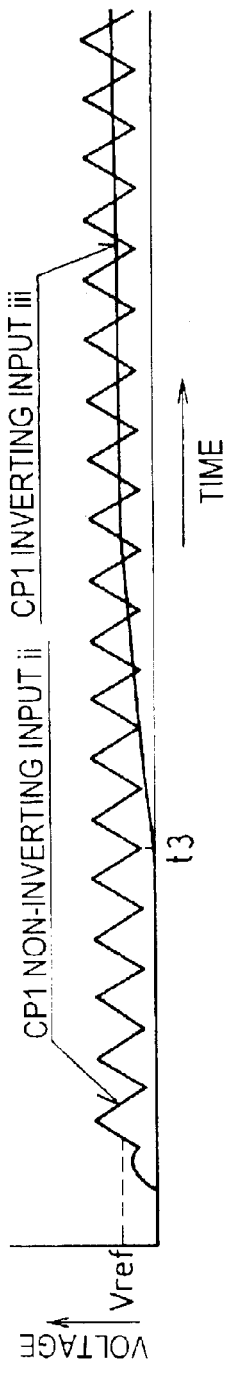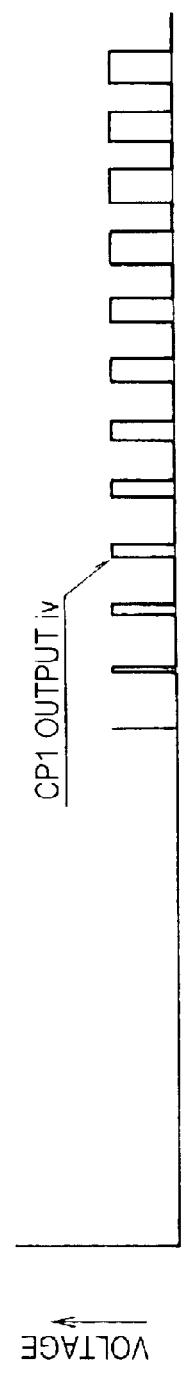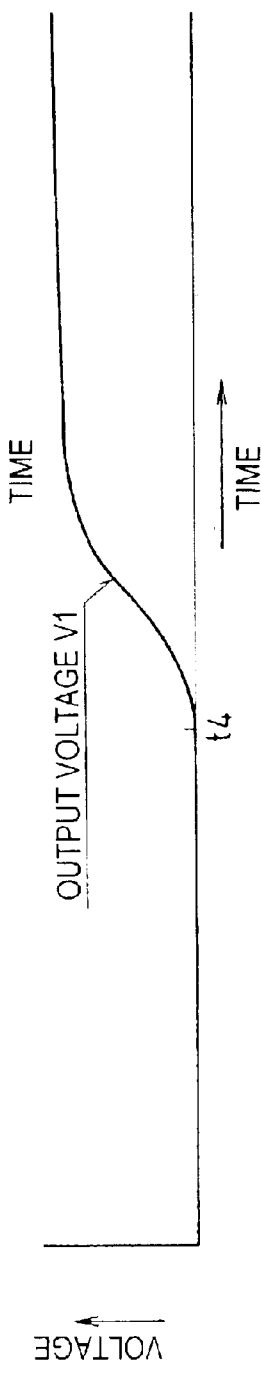
FIG. 3 (a)
FIG. 3 (b)
FIG. 3 (c)
FIG. 3 (d)

POWER SUPPLY UNIT HAVING A SOFT START FUNCTIONALITY AND PORTABLE APPARATUS EQUIPPED WITH SUCH POWER SUPPLY UNIT

FIELD OF THE INVENTION

This invention relates to a DC-DC conversion type power supply unit having soft start functionality, and to a portable apparatus equipped with such power supply unit.

BACKGROUND OF THE INVENTION

Conventional portable apparatuses such as PDAs and personal computers (PCs) have a multiplicity of DC-DC conversion type power supply circuits one for each component such as a display, a communications unit, and a control unit (e.g. CPU), and a common battery to supply electric power to the respective power supply circuits. Each of the power supply circuits is formed in the respective component of a semiconductor device so as to generate a predetermined voltage for the device. In most cases, the power supply circuit is configured to become operable only when the output of the device is needed. In this way, the operable time of the common battery can be extended by saving its energy when it is not needed by the power supply circuit.

These power supply circuits are constructed in the forms of series-pass type DC power sources, step-up type switching DC power sources, and step-down type switching DC power sources. In either of these DC power supply circuits, a large current flows through it during a startup of the circuit, which results in a large drop, and hence an instability, in the output voltage thereof (referred to as source voltage). Thus, fluctuations of the source voltage take place every time one of the power supply circuits is started up, thereby resulting in adverse effects including malfunctions and/or erroneous operations of the control circuits of a semiconductor device if it is equipped with these power supply circuits. The fluctuations of the source voltage can be suppressed by providing the power supplying battery with a sufficient capacity to absorb a large current change. However, it is difficult to do so in portable apparatuses, since they must be compact in size and light in weight.

In order to circumvent such adverse effects, during a startup of a power supply circuit, a so-called soft start is recommended in which the output voltage of a power supply circuit is slowly increased. To do so, generally, the reference voltage supplied to the power supply circuit is gradually increased from zero.

In a case where the semiconductor device includes only one power supply circuit, there will be no problem in the gradual increase of the reference voltage in the soft start. However, this is not the case if the semiconductor device includes multiple power supply circuits that should be individually actuated and stopped. In such a case as mentioned above, in order to allow for a soft start of any power supply circuit, the reference voltage is varied every time one of the power supply circuits is actuated. As a consequence, the rest of the power supply circuits are affected by the change in the reference voltage.

One way to avoid such unintended fluctuations of the reference voltage is to employ multiple voltage sources providing only reference voltages (referred to as reference-voltage sources) to thereby allow for individual soft starts of the respective power supply circuits. However, provision of multiple reference-voltage sources inevitably results in an increase in the area of the voltage sources in the semiconductor device. In addition, such multiple voltage sources disadvantageously consume large power.

SUMMARY OF THE INVENTION

It is, therefore, an object of the present invention to provide a DC-DC conversion type power supply unit capable of permitting soft starts of multiple power supply circuits such that they can be individually actuated and stopped while keeping constant (i.e. without varying) the reference voltage of a common reference-voltage source, thereby suppressing fluctuations of the output voltages of the power supply circuits.

It is another object of the invention to provide a portable apparatus equipped with such power supply unit.

In accordance with one aspect of the invention, there is provided a DC-DC conversion type power supply unit for outputting a predetermined output voltage by converting a given source voltage of a DC power source, comprising:
  a reference-voltage source;
  an error amplifier including
    a first input terminal for receiving a reference voltage from said reference-voltage source,
    a second input terminal for receiving as a feed back voltage a voltage associated with the output voltage,
    an output terminal, and
    a feedback circuit that has a condenser (i.e. capacitor) connected between the second input terminal and the output terminal, the error amplifier adapted to amplify the voltage difference between the first and second input terminals to generate at the output terminal a control signal for controlling said output voltage; and
  a voltage adjuster capable of setting the voltage of the second input terminal to a prohibition voltage that prohibits the predetermined output voltage from being outputted from the unit, wherein
  the voltage adjuster is driven to fix the voltage of the second input terminal at the prohibition voltage for a predetermined period of time during a startup of the power supply unit.

In accordance with another aspect of the invention, there is provided a DC-DC conversion type power supply unit including a common reference-voltage source and a multiplicity of individually controllable DC-DC conversion type power supply circuits for converting the source voltage of a DC power source to a multiplicity of predetermined output voltages, wherein
  each of the multiplicity of DC-DC conversion type power supply circuits comprises
    an error amplifier including
      a first input terminal for receiving a reference voltage from the reference-voltage source,
      a second input terminal for receiving a voltage associated with the output voltage as a feed back voltage,
      an output terminal, and
      a feedback circuit that has a condenser connected between the second input terminal and the output terminal, the error amplifier adapted to amplify the voltage difference between the first and second input terminals to generate at the output terminal a control signal for controlling the output voltage; and
    a voltage adjuster capable of setting the voltage of the second input terminal to a prohibition voltage that prohibits the predetermined output voltage from being outputted from the power supply circuit, and wherein
    the voltage adjuster is driven to fix the voltage of the second input terminal to the prohibition voltage for a predetermined period of time during a startup of the power supply circuit.

In accordance with a further aspect of the invention, there is provided a portable apparatus equipped with a battery, a common reference-voltage source powered by the battery and a multiplicity of individually controllable DC-DC conversion type power supply circuits for converting the voltage of the battery to a multiplicity of predetermined output voltages, wherein each of the multiplicity of DC-DC conversion type power supply circuits comprises an error amplifier including a first input terminal for receiving a reference voltage from the reference-voltage source, a second input terminal for receiving the output voltage as a feed back voltage, an output terminal, and a feedback circuit that has a condenser connected between the second input terminal and the output terminal, the error amplifier adapted to amplify the voltage difference between the first and second input terminals to generate a control signal for controlling the output voltage provided at the output terminal; and a voltage adjuster capable of setting the voltage of the second input terminal to a prohibition voltage that prohibits the predetermined output voltage from being outputted from the output terminal, wherein the voltage adjuster is driven to fix the voltage of the second input terminal to the prohibition voltage for a predetermined period of time during a startup of the DC-DC conversion type power supply circuit.

In accordance with a further aspect of the invention, there is provided a method of starting up a DC-DC conversion type power supply unit for converting a source voltage of a DC power source to a predetermined voltage, comprising steps of:

inputting a reference voltage to a first input terminal of an error amplifier;

feeding back a voltage associated with the output voltage to a second input terminal of the error amplifier;

connecting a feedback condenser between the first input terminal and the output terminal of the error amplifier;

rendering the DC-DC conversion type power supply unit operable; and fixing the voltage of the second input terminal at a prohibition voltage that prohibits the output voltage from being outputted from the power supply unit for a predetermined period of time during a startup of the DC-DC conversion type power supply unit to charge up the feedback condenser to a predetermined voltage; and after the predetermined period of time, gradually varying the output of the error amplifier while discharging the charging voltage of the feedback condenser.

The invention enables soft start of a power supply unit by simply coupling the second input terminal of the error amplifier to a specific voltage without changing the level of the reference voltage at all. It will be appreciated that no soft start circuit is necessary for continuously changing the reference voltage to implement soft start of the power supply unit.

It is noted that in accordance with the invention a common reference-voltage source may be connected to a multiplicity of DC-DC conversion type power supply circuits such that they can be individually actuated and stopped without changing the reference voltage. As a consequence, any one of the power supply circuits can be started up without appreciably affecting a common power supply such as a battery. Thus, the invention provides a power supply unit suitable for miniaturized, light weight, battery-operated portable apparatuses such as cellular phones, PDAs, and PCs operating at low power.

BRIEF DESCRIPTION OF THE DRAWINGS

FIGS. 3(a)–(d) are timing diagrams for the major sections of the first embodiment.

DETAILED DESCRIPTION OF THE PREFERRED EMBODIMENTS

Preferred embodiments of a DC-DC conversion type power supply unit of the invention will now be described in detail with reference to FIGS. 1–4. In the subsequent sections of the specification, voltages will be measured with reference to the ground potential unless otherwise stated.

Figure 1:
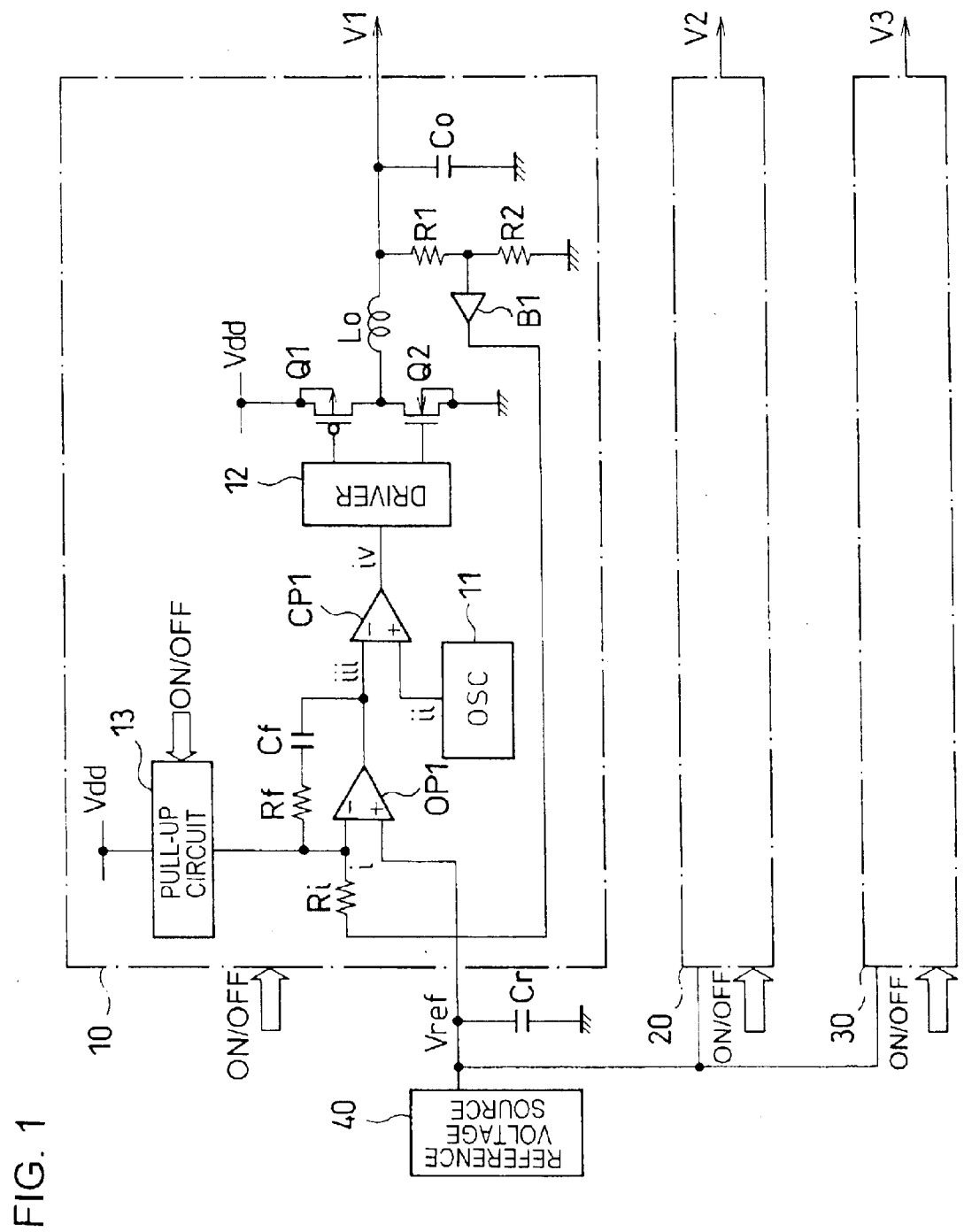
FIG. 1 is a schematic circuit diagram showing a structure of a DC-DC conversion type power supply unit in accordance with a first embodiment of the invention.
Figure 2:
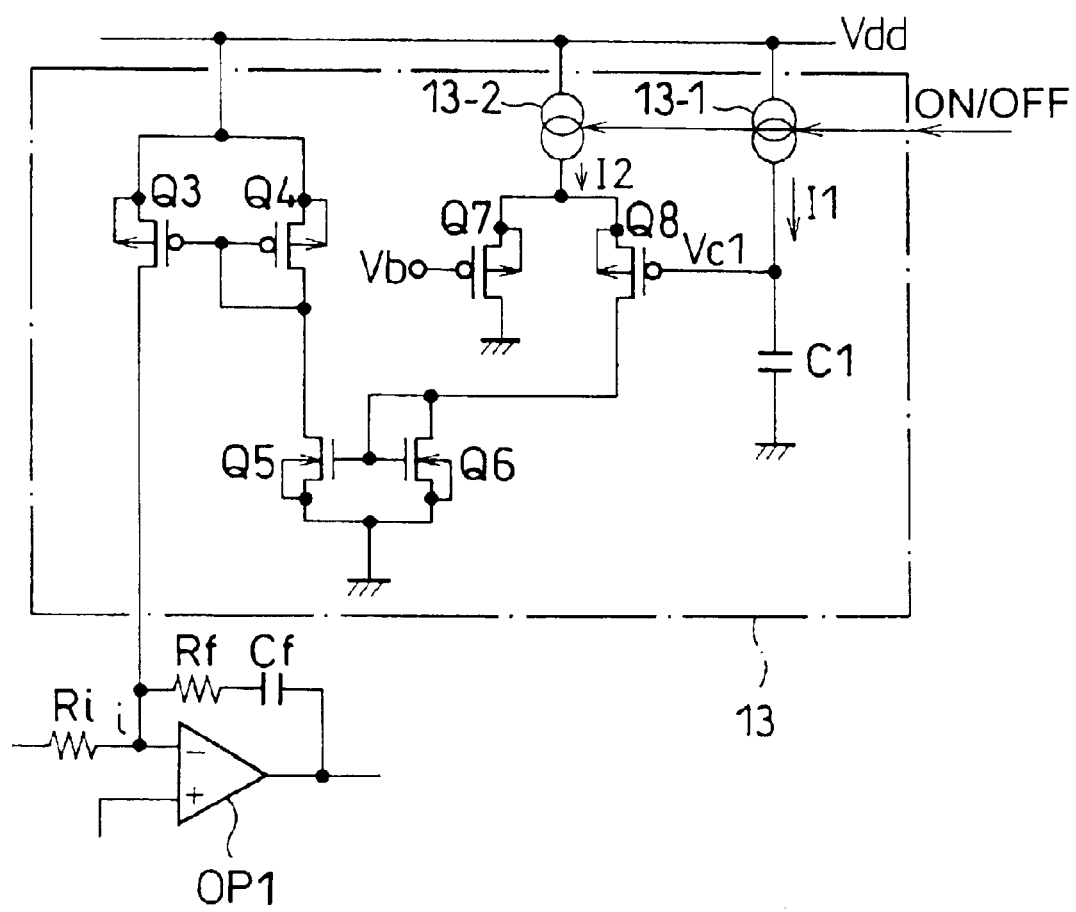
FIG. 2 is a schematic circuit diagram of a suitable pull-up circuit for use in the first embodiment.

Referring to FIG. 1, there is shown a first DC-DC conversion type power supply unit according to the invention. FIG. 2 shows a suitable pull-up circuit for use in the first embodiment. FIG. 3 shows timing diagrams for the major sections of the first embodiment.

The DC-DC conversion type power supply unit of FIG. 1 has a reference-voltage source 40 supplying a multiplicity of DC-DC conversion type power supply circuits 10, 20, and 30 with a common reference voltage Vref. A smoothing condenser Cr is provided to further stabilize the reference voltage.

This DC-DC conversion type power supply unit may be used as a power supply unit of a portable apparatus such as a cellular telephone, a PDA and a PC. The power supply circuits 10, 20, and 30 are provided in various components such as a display, a communications unit, and a control unit (CPU). They respectively provide predetermined output voltages V1, V2, and V3.

Each of the power supply circuits 10, 20, and 30 is individually actuated by an actuating signal ON when its output voltage is necessary and stopped by a stop signal OFF when it becomes unnecessary. Although only three power supply circuits are shown in the figure, it will be apparent to those skilled in the art that the number of these circuits is arbitrary. It can be one in a case.

Since these power supply circuits 10, 20, and 30 can be the same in circuit structure, only the power supply circuit 10 will be described in detail below.

In the power supply circuit 10, the non-inverting input terminal (+) of an operational amplifier OP1 is supplied with the reference voltage Vref of the reference-voltage source 40. This reference voltage Vref is also input in common to the power supply circuits 20 and 30. It is maintained at a fixed level.

The inverting input terminal (−) of the operational amplifier OP1 is supplied with a feedback voltage proportional to the output voltage V1, via an input resistor Ri. In the example shown herein, the feedback voltage is provided by dividing the output voltage V1 by voltage dividing resistors R1 and R2.

A feedback condenser Cf and a feedback resistor Rf are connected between the inverting input terminal (−) and the output terminal of the operational amplifier OP1. The operational amplifier OP1, input resistor Ri, feedback condenser Cf, and feedback resistor Rf together form an error amplifier.

A pull-up circuit 13 has functionality that it fixes the voltage of the inverting input terminal (−) of the operational amplifier OP1 at a predetermined voltage for a predetermined period of time during a startup of the power supply circuit.

This pull-up circuit 13, provided between the inverting input terminal (−) of the operational amplifier OP1 and the voltage source Vdd, is operated by an actuating signal ON and stopped by a stop signal OFF, in such a way that the inverting input terminal (−) of the operational amplifier OP1 is pulled up to the source voltage Vdd, which is higher than the reference voltage Vref, while the pull-up circuit 13 is turned ON, and then turned OFF subsequently. This action of the pull-up circuit 13 temporarily causes the feedback condenser Cf to be charged to the source voltage Vdd and then gradually discharge as the pull-up circuit 13 is turned OFF. As a consequence, the inverting input i to the inverting terminal (−) also gradually lowers from the source voltage Vdd to the reference voltage Vref.

A comparator CP1 receives at the inverting input terminal thereof the output iii of the operational amplifier OP1 and at the non-inverting input terminal thereof a triangular wave signal ii from an oscillation circuit 11, and compares the two inputs. The comparator CP1 generates at the output terminal thereof a pulse-width controlled output iv in accordance with the result of the comparison. The output iv is supplied to a driver 12.

A p-type MOS transistor Q1 and an n-type MOS transistor Q2 both serving as switching elements are connected in series between the source voltage Vdd and the ground. These MOS transistors Q1 and Q2 are alternately turned ON and OFF by a driving pulse from the driver 12 generated in response to the output iv of the comparator CP1. The node voltage of the MOS transistors Q1 and Q2 is smoothed by a smoothing coil Lo and a smoothing condenser Co, resulting in an output V1 which is stepped down from the source voltage Vdd.

FIG. 2 illustrates an arrangement of the pull-up circuit 13 that utilizes constant-current sources.

As shown in FIG. 2, the constant current sources 13-1 and 13-2 respectively provide constant currents in response to an actuating signal ON and stop the currents in response to a stop signal OFF. The constant current source 13-1 charges a condenser C1 by a constant current 11. A constant current 12 from the constant current source 13-2 flows through either a p-type MOS transistor Q7 that is impressed with a bias voltage Vb to the gate thereof or a p-type MOS transistor Q8 that is impressed with a charging voltage Vc1 of the condenser C1 to the gate thereof. The constant current 12 flows through the MOS transistor Q8 when the bias voltage Vb exceeds the charging voltage Vc1, but flows through the MOS transistor Q7 when the bias voltage Vb becomes lower than the charging voltage Vc1.

The constant current 12, which has flown through the MOS transistor Q8, then flows through an n-type MOS transistor Q6, causing a constant current proportional to the current 12 to flow through an n-type MOS transistor Q5 that is connected to the MOS transistor Q6 in the current mirror configuration. The constant current flowing through the MOS transistor Q5 flows through a p-type MOS transistor Q4, which causes a constant current proportional to the constant current 12 to flow through a p-type MOS transistor Q3 connected to the MOS transistor Q4 in the current mirror configuration.

Thus, the charging voltage Vc1 gradually rises from zero voltage when an actuating signal ON is supplied to the pull-up circuit 13 of FIG. 2. Since the MOS transistor Q3 allows a current to pass through it in proportion to the constant current 12 until the charging voltage Vc1 reaches the bias voltage Vb, the inverting input terminal (−) of the operational amplifier OP1 is pulled up substantially to the source voltage Vdd. With this pulling up of the inverting input terminal (−), the output iii of the operational amplifier OP1 is lowered, so that the feedback condenser Cf is also charged substantially to the source voltage Vdd.

As the charging voltage Vc1 reaches the bias voltage Vb in the course of time, the MOS transistor Q3 is turned off accordingly, thereby terminating to pull up the inverting input terminal to the source voltage Vdd. Subsequently, the electric charge stored in the feedback condenser Cf is discharged through the feedback resistor Rf and the input resistor Ri. Subsequently, the voltage of inverting input terminal (−) of the operational amplifier OP1 gradually lowers in accordance with the time constant of the discharge.

It is noted that the pull-up time, defined by the length of the pull-up period initiated and sustained by the actuating signal ON and ended by the stop signal OFF to turn off the MOS transistor Q3, can be accurately set up since it is determined by charging the constant current by the constant current 11. The pull-up circuit 13 consumes no power after the stop signal OFF is supplied, since the constant current sources 13-1 and 13-2 are then turned off. Of course power is not supplied to the power supply circuit 10 while the stop signal OFF is supplied to the constant current sources 13-1 and 13-2.

Referring to the timing diagrams shown in FIGS. 3(a)–(d), operations of a DC-DC conversion type power supply unit in accordance with a first embodiment as shown in FIGS. 1–2 will be described.

Multiple power supply circuits 10, 20, and 30 are supplied with an actuating signal ON or a stop signal OFF. Each of the power supply circuits receiving an actuating signal ON receives the reference voltage Vref from the reference-voltage source 40 to generate a predetermined output voltage.

Suppose now that the power supply circuit 10 is in operation. In this case, a voltage obtained by dividing the output voltage V1 is fed back to the error amplifier that includes the operational amplifier OP1, where the feedback voltage is compared with the reference voltage Vref. The pull-up circuit 13 is turned off after the pull-up circuit has attained a steady state subsequent to the startup.

The output voltage iii of the error amplifier and the output ii of the oscillating circuit 11 having a triangular waveform are compared in the comparator CP1 to provide the driver 12 with a pulsed output iv. Each of the pulses has a given pulse width determined by the output voltage iii of the error amplifier. The driver 12 controls ON/OFF switching of the MOS transistors Q1 and Q2 in accordance with the width of the pulses of the output iv. The output voltage V1 is smoothed by the smoothing coil Lo and the smoothing condenser Co before it is outputted from the power supply circuit.

If a stop signal OFF is supplied to the power supply circuit 10 in operation, all of the components of the circuit, that is, the operational amplifier OP1, comparator CP1, buffer B1, oscillating circuit 11, driver 12, and pull-up circuit 13, are turned off, thereby stopping energy consumption by these circuit elements. Consequently, the electric charge stored in the smoothing condenser Co is discharged through the voltage dividing resistors R1 and R2 and a load circuit (not shown), thereby lowering the output voltage V1. The driver 12 preferably generates an output signal for turning off both of the MOS transistors Q1 and Q2.

As the output voltage V1 becomes necessary again, an actuating signal ON is supplied to the power supply circuit 10. The actuating signal ON causes the source voltage to be supplied to the respective components of the power supply circuit 10, thereby activating the components.

In this case, the power supply circuit undergoes a soft start in order to avoid a sudden increase in amperage, as follows. To begin with, upon receipt of an actuating signal ON at time t1, the constant current sources 13-1 and 13-2 of the pull-up circuit 13 start furnishing constant currents. The constant current I1 starts charging the condenser C1, At this stage (immediately after t1), however, the voltage Vc1 for charging the condenser C1 is sufficiently lower than the bias voltage Vb that the MOS transistors Q8 remains turned on. The MOS transistor Q3 is also turned on.

As a consequence, at time t1, the inverting input terminal (−) of the operational amplifier OP1 is instantly pulled up to substantially the source voltage Vdd, as shown in FIG. 3(a). Since the source voltage Vdd is sufficiently higher than the reference voltage Vref, the output voltage of the operational amplifier OP1 remains low. As a result, the feedback condenser Cf will be substantially charged to the source voltage.

This pull-up action will last until time t2 when the charged voltage Vc1 of the condenser C1 reaches the bias voltage Vb and causes the MOS transistor Q7 to be turned on, the MOS transistor Q8 to be turned off, and the MOS transistor Q3 to be turned off.

The length of the period from t1 to t2 is the pull-up time, which is determined based on the time that the respective components become actually operable after they are activated by the actuating signal ON. In the example shown herein, the pull-up time can be accurately controlled, since it can be determined by the constant-current charge to the condenser C1.

Starting at time t2, when the pull-up action ends, the electric charge stored in the feedback condenser Cf is gradually discharged. The time constant of this discharge is determined by the capacitance of the feedback condenser Cf and the resistance of the feedback resistor Rf and of the input resistor Ri. At the same time, the voltage i of the inverting input terminal (−) of the operational amplifier OP1 gradually lowers from the source voltage Vdd to the reference voltage Vref of the non-inverting input terminal (+).

The output of the operational amplifier OP1, or the input iii to the inverting input terminal (−) of the comparator CP1, begins to rise at time t3 when the voltage i of the inverting input terminal (−) of the operational amplifier OP1 approaches the reference voltage Vref applied to the non-inverting input terminal (+), as shown in FIG. 3(b). The rise time constant of the input iii fed to the inverting input terminal (−) is determined mainly by the resistance of the feedback resistor Rf and the capacitance of the feedback condenser Cf.

The comparator CP1 begins to generate the output pulses iv at time t4 at which the input iii fed to the inverting terminal (−) of the comparator CP1 crosses the triangular wave signal ii supplied to the non-inverting input terminal (+), as shown in FIG. 3(c). The pulse width of each output pulse iv increases with time.

The driving period of the switching MOS transistors Q1 and Q2 are controlled by the pulse width of the output pulse iv. The currents exiting the MOS transistors Q1 and Q2 are passed to the smoothing coil Lo and the smoothing condenser Co to smooth the currents, and stored in the smoothing condenser Co. As a consequence, the output voltage V1 gradually grows from zero to a predetermined level, as shown in FIG. 3(d).

In this way, in accordance with the first embodiment of the invention, a multiplicity of DC-DC conversion type power supply circuits 10, 20, and 30 can be connected to a common reference-voltage source 40 that maintains a constant reference voltage Vref. It will be appreciated that the multiple DC-DC conversion type power supply circuits are individually controllable, that is, they can be individually actuated and stopped as needed.

It is noted that in starting up a power supply circuit (e.g. circuit 10) its output voltage V1 is fed back to the inverting input terminal (−) of the operational amplifier OP1 so that the inverting input terminal (−) is once pulled up to a source voltage Vdd which is higher than the reference voltage Vref so that the output voltage V1 of the power supply circuit will not be outputted. Only after this startup period, the voltage of the inverting input terminal (−) of the operational amplifier OP1 gradually grows to the reference voltage Vref as the feedback condenser Cf of feedback circuit discharges. Thus, each of the multiple power supply circuits can individually undergo a soft start automatically.

It will be understood that operations of any one or more of the multiple power supply circuit(s) can be controlled (i e actuated and stopped) without appreciably affecting a common power supply such as a battery. The power supply unit is thus suitable for a portable apparatus, especially for a miniaturized, energy effective, light weight portable apparatus such as a cellular phone, a PDA, and a portable PC.

In response to an actuating signal ON, the pull-up circuit 13 sustains other components of the circuit inoperable for a preliminary period of time, until they become fully operable. This preliminary period can be accurately set up by charging the condenser C1 with the constant current I1. The power supply circuits may be softly started up automatically following the preliminary period. As a consequence, a power supply circuit may have a sure and stable startup.

Figure 4:
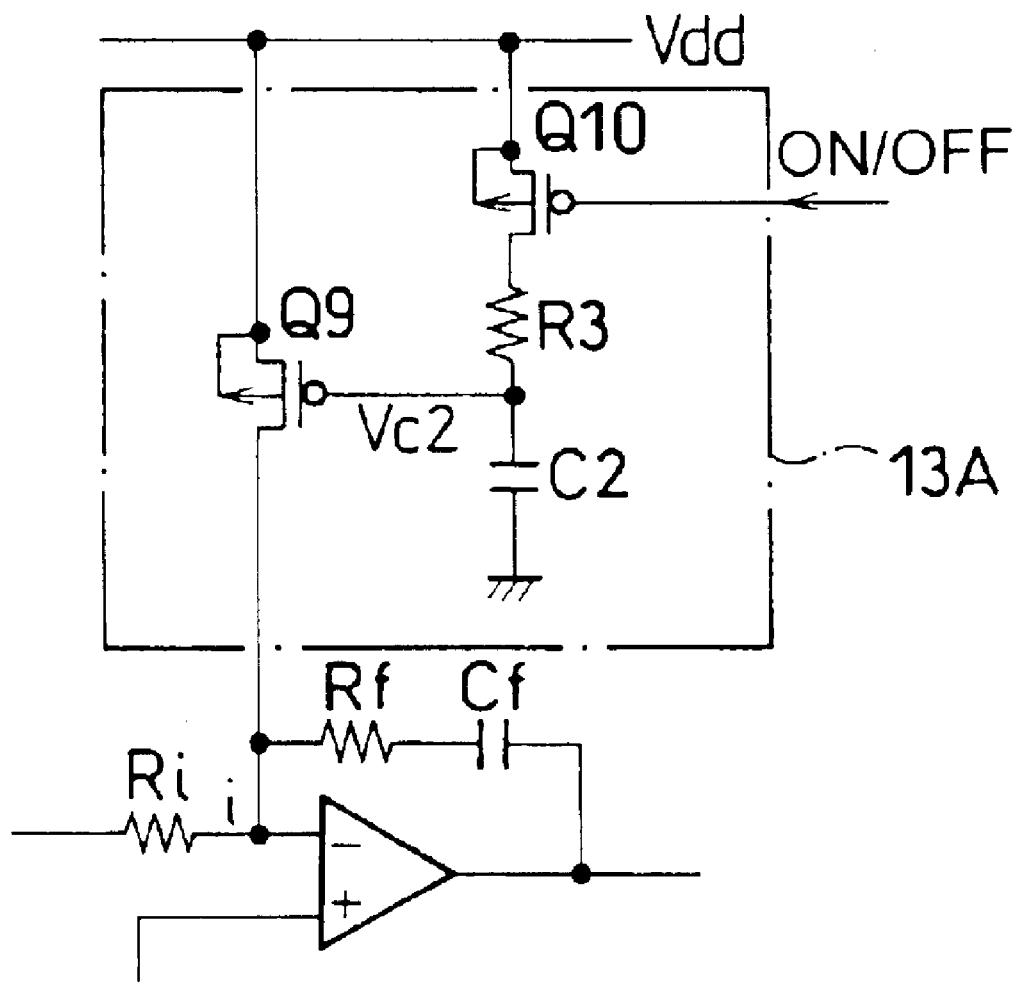
FIG. 4 is a schematic circuit diagram of another suitable pull-up circuit.

FIG. 4 is an alternative circuit diagram of a pull-up circuit of the invention. As compared with the pull-up circuit 13 of FIG. 2 adapted to operate under constant current sources, the pull-up circuit 13A of FIG. 4 is modified to operate under a constant voltage source.

As shown in FIG. 4, a p-type MOS transistor Q10, a resistor R3, and a condenser C2 are connected in series between the source voltage Vdd and the ground. An actuating signal ON and a stop signal OFF are supplied to the gate of the MOS transistor Q10. In the example shown in FIG. 4, the actuating signal ON has a low (L) level, and the stop signal OFF has a high (H) level. Connected between the source voltage Vdd and the inverting input terminal (−) of the operational amplifier OP1 is a p-type MOS transistor Q9, with the gate thereof connected to the node of the resistor R3 and the condenser C2. This MOS transistor Q9 corresponds to the MOS transistor Q3 of the pull-up circuit shown in FIG. 2.

Upon receipt of an actuating signal ON, the MOS transistor Q10 is turned on, raising the charging voltage Vc2 for charging the condenser C2 with the rate determined by the time constant of the branch formed of the resistor R3 and the condenser C2. The MOS transistor Q9 will remain turned on until the charging voltage Vc2 reaches the threshold level of the MOS transistor Q9, thereby pulling up the inverting input terminal (−) of the operational amplifier OP1 to the substantial source voltage Vdd.

As the charging voltage Vc2 reaches the threshold of the MOS transistor Q9, the MOS transistor Q9 will be turned off to thereby ending its action to pull up the inverting input terminal (−) Other phases of the pull-up action is similar to those described in connection with FIGS. 1–3.

Although the pull-up circuit of FIG. 4 lacks accuracy in controlling the pull-up action as compared with the one shown in FIG. 2, this circuit is simpler in form.

In the example shown herein, the voltage of the input terminal of the operational amplifier OP1 is pulled up to a predetermined voltage (e.g. the source voltage Vdd) during a startup. This configuration presumes that the driver 12 driving the switching MOS transistors Q1 and Q2 has a logical structure to prevent the output voltage of the associated power supply circuit from being outputted therefrom when the input terminal is pulled up to the predetermined voltage. In the case where the driver 12 is configured to be pulled down to a predetermined voltage to prevent the output voltage from being outputted from the power supply circuit, an appropriate pull-down circuit (e.g. a ground potential) is required for logically pulling down the driver 12. Such pull down circuit may be easily formed by modifying the circuit shown in FIG. 2 or the circuit shown in FIG. 4.

In any event, it suffices to provide a feedback loop in the DC-DC conversion type power supply circuit such that a second input terminal of the error amplifier receiving a feedback voltage from the output of the circuit is to pulled up or pulled down not to output the output voltage for a predetermined period of time.

Although the invention has been described with reference to a particular example that utilizes a DC-DC conversion type power supply circuit in the form of a step-down type switching DC power supply circuit, the invention is not limited to the example. For example, a power supply unit in the form of a series-pass type DC power supply circuit and a step-up type switching DC power supply can be utilized equally well. The invention may be applied to any power supply unit that utilizes an error amplifier having a feedback condenser.

What I claim is:

1. A DC-DC conversion type power supply unit for outputting a predetermined output voltage by converting a given source voltage of a DC power source, comprising:
   a reference-voltage source;
   an error amplifier including
      a first input terminal for receiving a reference voltage from said reference-voltage source,
      a second input terminal for receiving as a feed back voltage a voltage associated with said output voltage,
      an output terminal, and
      a feedback circuit that has a condenser connected between said second input terminal and said output terminal, said error amplifier adapted to amplify the voltage difference between said first and second input terminals to generate at said output terminal a control signal for controlling said output voltage; and
   a voltage adjuster capable of setting the voltage of said second input terminal to a prohibition voltage that prohibits said predetermined output voltage from being outputted from said power supply unit, wherein
   said voltage adjuster is driven to fix the voltage of said second input terminal at said prohibition voltage for a predetermined period of time during a startup of said power supply unit.

2. The DC-DC conversion type power supply unit according to claim 1, wherein
   said voltage adjuster has switching means connected between said second input terminal and a point having a specified potential, said switching means is switched on for said predetermined period of time during a startup of said power supply unit and subsequently switched off.

3. The DC-DC conversion type power supply unit according to claim 2, wherein said predetermined period of time is the time required for a timing condenser to be charged up from a given initial voltage to a predetermined threshold voltage during the startup.

4. The DC-DC conversion type power supply unit according to claim 2, wherein said specified potential is the potential of said DC power source.

5. The DC-DC conversion type power supply unit according to claim 3, wherein said timing condenser is charged by a predetermined constant current of a current source.

6. The DC-DC conversion type power supply unit according to claim 3, wherein said timing condenser is charged by a predetermined voltage of a voltage source.

7. The DC-DC conversion type power supply unit according to claim 1, wherein all the power sources connected to said power supply unit are turned off when said output voltage of said power supply unit is turned off.

8. The DC-DC conversion type power supply unit according to claim 1, further comprising an output transistor circuit controlled by said control signal of said error amplifier and an oscillating output signal of an oscillator, adapted to output said output voltage.

9. The DC-DC conversion type power supply unit according to claim 8, wherein said output transistor circuit is composed of MOS transistors.

10. A DC-DC conversion type power supply unit including a common reference-voltage source and a multiplicity of individually controllable DC-DC conversion type power supply circuits for converting the source voltage of a DC power source to a multiplicity of predetermined output voltages, wherein
   each of said multiplicity of DC-DC conversion type power supply circuits comprises
   an error amplifier including
      a first input terminal for receiving a reference voltage from said reference-voltage source,
      a second input terminal for receiving a voltage associated with said output voltage as a feed back voltage,
      an output terminal, and
      a feedback circuit that has a condenser connected between said second input terminal and said output terminal, said error amplifier adapted to amplify the voltage difference between said first and second input terminals to generate at said output terminal a control signal for controlling said output voltage; and
   a voltage adjuster capable of setting the voltage of said second input terminal to a prohibition voltage that prohibits said predetermined output voltage from being outputted from said power supply circuit, wherein
   said voltage adjuster is driven to fix the voltage of said second input terminal to said prohibition voltage for a predetermined period of time during a startup of said DC-DC conversion type power supply circuit.

11. The DC-DC conversion type power supply unit according to claim 10, wherein
   said voltage adjuster has switching means connected between said second input terminal and a point having a specified potential, said switching means switched on for said predetermined period of time during a startup of said power supply circuit and subsequently switched off.

12. The DC-DC conversion type power supply unit according to claim 11, wherein said predetermined period of time is the time required for a timing condenser to be charged up during the startup from a given initial voltage to a predetermined threshold voltage.

13. The DC-DC conversion type power supply unit according to claim 10, wherein all the power sources connected to said power supply circuit are turned off when said power supply circuit is turned off.

14. A portable apparatus equipped with a battery, a common reference-voltage source powered by said battery, and a multiplicity of individually controllable DC-DC conversion type power supply circuits for converting the voltage of said battery to a multiplicity of predetermined output voltages, wherein each of said multiplicity of DC-DC conversion type power supply circuits comprises
an error amplifier including
a first input terminal for receiving a reference voltage from said reference-voltage source,
a second input terminal for receiving said output voltages a feed back voltage,
an output terminal, and
a feedback circuit that has a condenser connected between said second input terminal and said output terminal, said error amplifier adapted to amplify the voltage difference between said first and second input terminals to generate at said output terminal a control signal for controlling said output voltage; and
a voltage adjuster capable of setting the voltage of said second input terminal to a prohibition voltage that prohibits said predetermined output voltage from being outputted from said power supply circuit, and wherein
said voltage adjuster is driven to fix the voltage of said second input terminal at said prohibition voltage for a predetermined period of time during a startup of said DC-DC conversion type power supply circuit.

15. The DC-DC conversion type power supply unit according to claim 14 wherein said voltage adjuster has switching means connected between said second input terminal and a point having a specified potential, said switching means switched on for said predetermined period of time during a startup of said power supply circuit and subsequently switched off.

16. The portable apparatus according to claim 15, wherein said predetermined period of time is the time required for a timing condenser to be charged up during the startup from a given initial voltage to a predetermined threshold voltage.

17. The DC-DC conversion type power supply unit according to claim 14, wherein all the power sources connected to said power supply unit are turned off when said output voltage of said power supply unit is turned off.

18. The portable apparatus according to claim 12, wherein said specified voltage is the potential of said DC power source.

19. The portable apparatus according to claim 12, wherein said specified potential is the ground potential.

20. A method of starting up a DC-DC conversion type power supply unit for converting a source voltage of a DC power source to a predetermined voltage, comprising steps of:

inputting a reference voltage to a first input terminal of an error amplifier:
feeding back a voltage associated with said output voltage to a second input terminal of said error amplifier;
connecting a feedback condenser between said first input terminal and said output terminal of said error amplifier;
rendering said DC-DC conversion type power supply unit operable; fixing the voltage of said second input terminal to a prohibition voltage that prohibits said predetermined output voltage from being
outputted from said power supply unit for a predetermined period of time during a startup of said power supply unit to charge up said feedback condenser to a predetermined voltage; and
after said predetermined period of time, gradually varying the output of said error amplifier while discharging said feedback condenser.

21. The method according to claim 18, wherein said predetermined period of time is the time required for a timing condenser to be charged up from a given initial voltage to a predetermined threshold voltage during the startup.

22. The method according to claim 16, wherein said prohibition voltage is the source voltage of said DC power source.

23. The method according to claim 16, wherein said prohibition voltage is the ground voltage.

* * * * *